US012654105B2

(12) United States Patent
Tinklenberg et al.

(10) Patent No.: US 12,654,105 B2
(45) Date of Patent: Jun. 16, 2026

(54) AI GENERATED GHOST PLAYER

(71) Applicants:Sony Interactive Entertainment Inc., Tokyo (JP); Sony Interactive Entertainment LLC, San Mateo, CA (US)

(72) Inventors: Bethany Tinklenberg, Oakland, CA (US); Angela Webb, San Lorenzo, CA (US)

(73) Assignees: Sony Interactive Entertainment Inc., Tokyo (JP); Sony Interactive Entertainment LLC, San Mateo, CA (US)

( * ) Notice: Subject to any disclaimer, the term of this patent is extended or adjusted under 35 U.S.C. 154(b) by 287 days.

(21) Appl. No.: 18/486,081

(22) Filed: Oct. 12, 2023

(65) Prior Publication Data

US 2025/0121289 A1 Apr. 17, 2025

(51) Int. Cl.
*A63F 13/67* (2014.01)
*A63F 13/80* (2014.01)

(52) U.S. Cl.
CPC .............. *A63F 13/67* (2014.09); *A63F 13/80* (2014.09); *A63F 2300/538* (2013.01)

(58) Field of Classification Search
None
See application file for complete search history.

(56) References Cited

U.S. PATENT DOCUMENTS 9,533,230 B2 * 1/2017 Paquet ................ A63F 13/5375
2021/0299575 A1 9/2021 Stafford et al.

2022/0241691 A1 * 8/2022 Khan ...................... A63F 13/53
2024/0325902 A1 * 10/2024 Berry .................... A63F 13/285
2025/0058227 A1 * 2/2025 Bean ...................... A63F 13/798

FOREIGN PATENT DOCUMENTS

CN 110496394 B 12/2020

OTHER PUBLICATIONS

International Search Report and Written Opinion in International Appln. No. PCT/US2024/045415, mailed on Nov. 27, 2024, 11 pages.

* cited by examiner

*Primary Examiner* — Ronald Laneau
(74) *Attorney, Agent, or Firm* — Fish & Richardson P.C.

(57) ABSTRACT

Methods and systems are provided for providing a player with assistance during gameplay of a video game is provided. The method includes executing a video game for a game session. The player controls a player character during the game session. The method includes detecting selection of ghost assistance for the game session. The method includes linking or connecting the game session to an assistance artificial intelligence (AI) engine. The assistance AI engine operates to provide ghost assistance to the player in accordance with a mode setting. The ghost assistance is provided via a ghost character. The method includes rendering, during the game session, the ghost character performing interactive actions in the game. The interactive actions are generated responsive to control inputs generated by the assistance AI engine. The interactive actions by the ghost character are configured to progress the ghost character along an interactive path of the game.

20 Claims, 6 Drawing Sheets

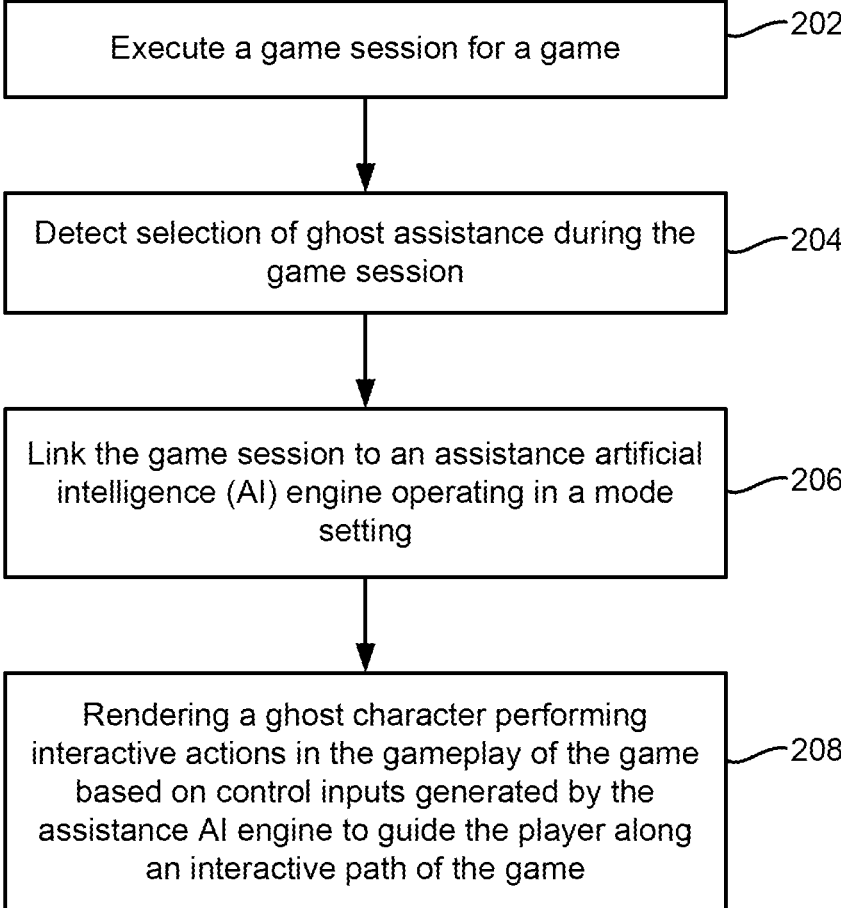

Execute a game session for a game — 202

Detect selection of ghost assistance during the game session — 204

Link the game session to an assistance artificial intelligence (AI) engine operating in a mode setting — 206

Rendering a ghost character performing interactive actions in the gameplay of the game based on control inputs generated by the assistance AI engine to guide the player along an interactive path of the game — 208

FIG. 2

AI GENERATED GHOST PLAYER

BACKGROUND

1. Field of the Disclosure

The present disclosure relates generally to computer implemented methods used for providing ghost assistance that is customized to the player's current gameplay and in accordance with a mode setting.

2. Description of the Related Art

The video game industry has seen many changes over the years. Users are now able to play video games using many types of peripherals and computing devices. Sometimes video games are played using a game console, where the game console is responsible for processing the game and generating the interactive input presented on display screens. Other times, video games are played in streaming mode, where a server or servers execute the game remotely and users provide input over a network connected device.

Although video game technology has seen many advances, some players find themselves in need of assistance. Games become very complicated, so players who are not experts oftentimes quit playing or find it hard to complete tasks. Players are able to do research for the game or even lookup prior gameplays on internet sites, but that process is time consuming and many times not very relevant to tasks and/or scenarios currently being encountered by the player.

To assist with this problem, some solutions have included the use of a character that a user can follow. However, the character is usually a graphic image or outlined image of a prior player that played the game and the user must follow the character watching the moves that occurred (including moves and interaction that is not relevant to the user's current gameplay scenarios). This is not, however, very useful for real-time assistance to a player that is encountering some difficulty with a specific scenario of gameplay or along the player's specific gameplay path. This is because the character does not know specifically what the player is playing or the context of the user's gameplay. Further, the character is typically only performing actions of one prior player. Further yet, the character is only presented for general game scenarios that relate to the game, not in relation to the context of the player's current gameplay.

It is in this context that implementations of the disclosure arise.

SUMMARY

Implementations of the present disclosure include methods, systems, and devices for providing ghost assistance to a player during gameplay of the game session, whereby the game assistance is intelligently provided by a ghost character based on control input learned by an artificial intelligence (AI) model of the gameplay, trained from a plurality of training footage sources and a mode setting selected therefore. Broadly speaking, an AI model is trained using training footage of gameplay of the game to identify game scenarios and learn to interactivity necessary to progress in the game from the training footage. During live gameplay by a player, game state data is analyzed in order to identify a scenario occurring in the context of the gameplay of the player. The scenario occurring during the live gameplay can then be processed by the AI model and an assistance AI engine in order to provide a ghost character with control inputs for animation/control to guiding the player in relevant interactivity of the game. The relevant interactivity is for the context of the gameplay of the player, not just some prior gameplay of another player. The ghost character can therefore be controlled by the assistance AI engine during gameplay and provide the player with visual illustrations of how certain game scenarios are played in order for the character controlled by the player to be able to achieve progress in the game.

In some embodiments, mode settings are identified for the way the assistance AI engine provides the control of the ghost character 113. Sometimes the ghost character provides limited assistance, sometimes the ghost character provides detailed and comprehensive assistance, and sometimes the ghost character provides assistance along a curtailed narrative of the game that is focused on specific characteristics of the game or playing style. Therefore, an AI generated ghost player can be a guide that can provide the player with an overlay showing how the gameplay is to be performed to achieve progress. In some embodiments, the ghost character can also provide example controller input button sequences. The ghost character can, in one embodiment hold an interactive conversation with the player's character, e.g., regarding guidance or instruction concerning the game.

In one embodiment, the overlay is in the form of the ghost character. The ghost character may be an outline character, a shadow character, or a fully animated character (i.e., not in the form of a ghost). In some embodiments, the ghost character can interact with the player. In some embodiments, the player can ask the ghost character for assistance in natural language queries. In other embodiments, the ghost character can be represented as a character from a movie, a character figure from another game, or a user generated character. In another embodiment, the ghost character can be represented as a custom character of the player. Broadly speaking, the ghost character provides the assistance due to its training to achieve from learning game scenarios and interactivity from training footage accessed from multiple disparate sources.

In one embodiment, a method for providing a player with assistance during gameplay of a video game is provided. The method includes executing a video game for a game session. The player controls a player character during the game session. The method includes detecting a selection of ghost assistance for the game session. The method includes linking or connecting the game session to an assistance artificial intelligence (AI) engine. The assistance AI engine operates to provide ghost assistance to the player in accordance with a mode setting. The ghost assistance is provided via a ghost character. The method includes rendering, during the game session, the ghost character performing interactive actions in the game. The interactive actions are generated responsive to control inputs generated by the assistance AI engine. The interactive actions by the ghost character are configured to progress the ghost character along an interactive path of the game. The player interacting with the player character is assisted by the ghost character along the interactive path. The interactive actions by the ghost character are visible to the player to thereby provide said ghost assistance.

In some implementations, the AI engine uses an AI model that is trained using gameplay footage associated with the game.

In some implementations, the gameplay footage is processed to extract context features for classification by the AI model to enable the AI model to identify game scenarios.

In some implementations, the control inputs generated by the assistance AI engine are used for controlling the ghost character to perform the interactive actions for one or more game scenarios in the game session to enable progressing in the game.

In some implementations, the AI engine uses an AI model trained using gameplay footage associated with prior plays of the game to identify game scenarios used by the assistance AI engine to generate control inputs for the ghost character for progressing in game scenarios occurring in the game session being played by the player.

In some implementations, the mode setting defines a type of assistance provided by the ghost character during the ghost assistance.

In some implementations, the mode setting is configured to be switched during the game session.

In some implementations, switching to another mode setting changes the type of assistance provided by the ghost character. The mode settings are selected from one of a story mode, a combat mode, an exploration mode, and a full game mode. Other modes may be defined based on one or more new or custom narratives chosen from options or provided/defined by the user.

In some implementations, the AI engine uses an AI model trained using gameplay footage associated with prior plays of the game to identify game scenarios used by the assistance AI engine to generate control inputs for the ghost character for progressing in game scenarios occurring in the game session being played by the player, and wherein the control inputs change upon a detected switch in mode setting.

In some implementations, the switch in mode setting causes the ghost character to focus on different gaming scenarios for which the ghost assistance is provided to the player.

In some implementations, the ghost assistance is one of a guide mode where the player character is guided along the interactive path.

In some implementations, the ghost assistance is one of a complete mode where the ghost character completes one or more interactive tasks for the player character along the interactive path.

In some implementations, the game footage is selected from one or more of user generated content (UGC) gameplay footage, footage containing game narrative content, footage containing game quest content, footage containing accomplishment content, footage containing character-type content, footage containing story-line content, footage containing in-game skins, footage containing game objects, in-network or out-of-network captured game footage, footage containing user setting data, footage containing privacy control data, footage containing age setting, or a combination of two or more thereof.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 2 illustrates one flowchart process for providing ghost assistance, in accordance with one embodiment.

DETAILED DESCRIPTION

The following implementations of the present disclosure provide methods, systems, and devices for providing ghost assistance to a player during gameplay of the game session, whereby the game assistance is intelligently provided by the ghost character based on a model of the gameplay of a plurality of training footage sources and a mode setting selected therefore. Broadly speaking, an AI model is trained using training footage of gameplay of the game to identify game scenarios and learn the interactivity necessary to progress in the game from the training footage. During live gameplay by a player, game state data is analyzed in order to identify a scenario occurring in the context of the gameplay of the player. The scenario occurring during the live gameplay can then be processed by the AI model and an assistance AI engine in order to provide a ghost character with control inputs for guiding the player in interactivity of the game. The ghost character can therefore be controlled by the AI assistance engine during gameplay and provide the player with visual illustrations of how certain game scenarios are played in order for the character controlled by the player to be able to achieve progress in the game.

With the above overview in mind, the following provides several example figures to facilitate understanding of the example embodiments.

Figure 1:
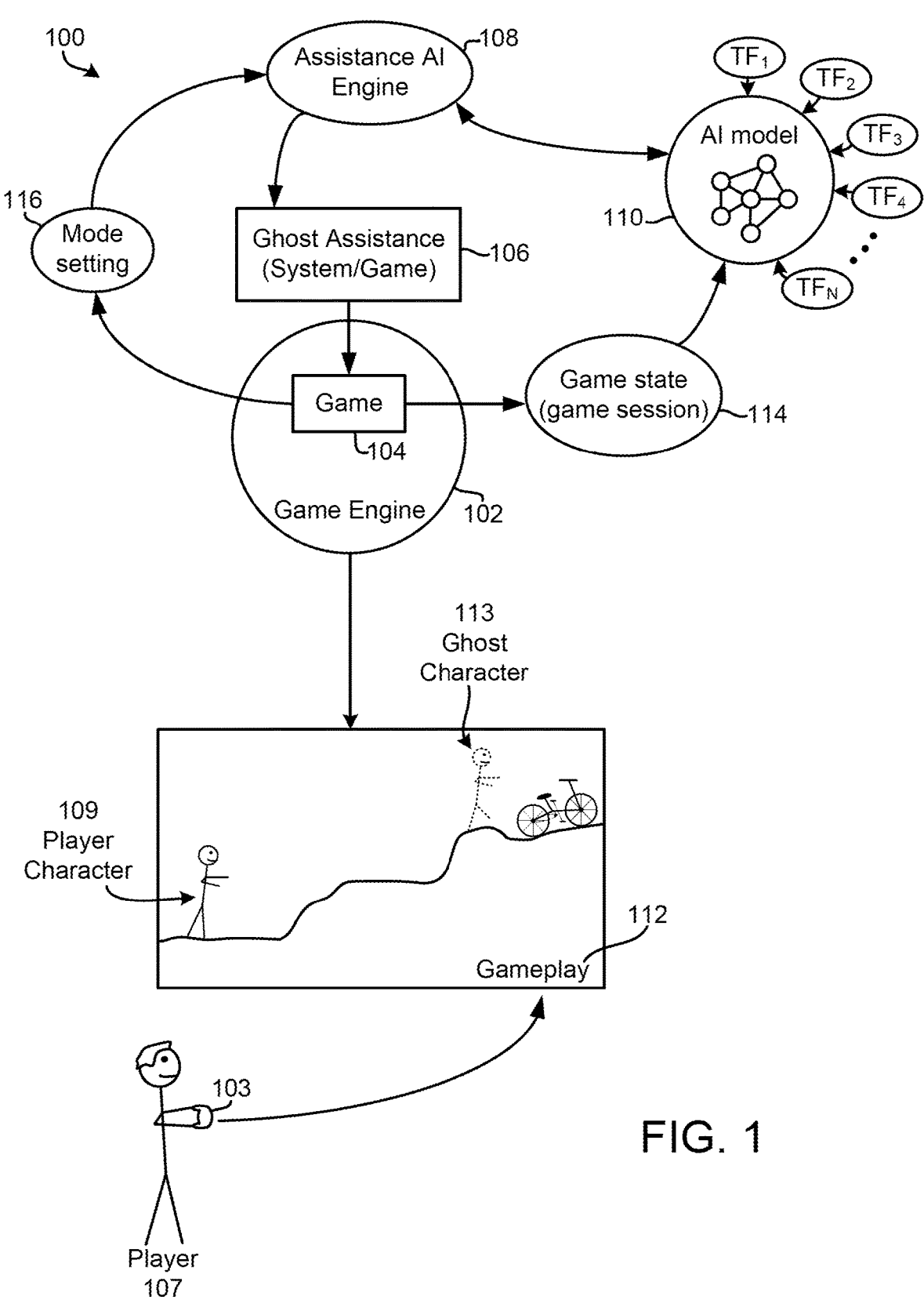
FIG. 1 illustrates a flow diagram 100 illustrating example method operations performed in order to provide ghost assistance to a player during gameplay, in accordance with one embodiment.

FIG. 1 illustrates a flow diagram 100 illustrating example method operations performed in order to provide ghost assistance to a player during gameplay, in accordance with one embodiment. As shown, the game engine 102 is configured to execute a game 104. The game 104 can be a locally executed game on a game console or computer, or a streamed game executed in the cloud. The game 104 is a game title, that is produced in accordance with game logic and game engine to enable gameplay of the game title. A user having access to the game can select game 104 to play, in either a first session of the gameplay or a follow-up game session of the gameplay. Typically, games are played over a period of time, whereby a player advances in the game progressively over one or more sessions of gameplay.

In one embodiment, the gameplay 112 of the game 104 is illustrated in FIG. 1. This general example shows a player character 109 that may be controlled by the player 107 and game objects and scenery rendered for the gameplay 112 by the game 104 and game engine 102. The player 107 is shown interacting with a controller 103 and providing control inputs to drive interactivity of the player character 109 during the gameplay 112. In other embodiments, keyboards, joysticks, gestures, and other interactive inputs can be used to drive interactivity of the player character 109 during the gameplay 112.

In this example, a ghost character 113 is rendered in the gameplay 112 during the game session. The ghost character 113 is rendered to provide ghost assistance to the player 107, which may enable the player character 109 to follow or learn what interactivity should be done to advance in the game. As mentioned above, the ghost character 113 may be an outline of a character, a shadow of a character, another character, a fully animated character, a partially animated character, a custom character, a character rendered in the look and feel of a movie character, a stick figure, an animated head or face, animated hands and a partial character body, or a combination of two or more thereof.

Advancement in the game can include moving from one gaming scenario to another, achieving interactivity skills, learning input combinations, learning new paths to take throughout the game world, conquering obstacles, beating bosses, scoring points, winning trophies, or generally advancing from one stage to another stage in the game or from level to level.

In this embodiment, ghost assistance 106 can be selected by the player 107 in order to play the game with the assistance provided by the ghost character 113. In one embodiment, the ghost assistance 106 is a function, code, sub-system, plug-in, middle-ware, or a combination thereof that is provided by the game 104. In another embodiment, the ghost assistance 106 can be provided by the system software, e.g. system software of a game console or system software enabled by a personal computer or other computing device. In either embodiment, the ghost assistance 106 can be selected by the player 107 before the game is played, or during gameplay.

In addition to selecting ghost assistance 106, a mode setting 116 is identified as selected by the player 107. In other embodiments, interactive logic can select or suggest a mode setting 116 to be selected by the player 107 or the mode setting 116 can be automatically applied by the system, or code, or artificial intelligence engine.

The mode setting 116 is input to assist artificial intelligence (AI) engine 108. The assistance AI engine 108 will receive the mode setting 116 selection and use that setting to activate the type of the assistance it will provide via the ghost character 113 to the player 107. As will be described below, the type of assistance can vary, depending on the mode setting 116. In one embodiment, an artificial intelligence (AI) model 110 is generated, trained, and provided as an agent for the assistance AI engine 108.

For example, the AI model is trained over time using various types of training footage from prior game place of the game 104. The training footage can include gameplay from prior sessions by the player 107 or a number of other players that may be accessing the game over a network, a service, an online server, or cloud-based system. In some embodiments, an application programming interface (API) can be used to access one or more sites that can contain media (e.g., pictures, videos, clips, shared sequences, posted screen shots, mini-games, etc.) associated with one or more of said types of training footage. Utilizing the various types of training footage, the AI model 110 is configured to extract context features from the various training footage in order to classify the interactivity contained in the training footage. The extracted features will assist in the classification utilized by the AI model in order to identify game scenarios. The game scenarios identified from the training footage can then be learned by the AI model to detect interactivity inputs that would be useful in achieving specific outcomes in different scenarios of the game.

By way of example, control inputs can be generated by the assistance AI engine 108, responsive to identified game scenarios by the AI model 110, which are then used to provide those control inputs to drive interactivity of the ghost character 113. The ghost character 113 will therefore interact in the gameplay 112 in accordance with interactivity inputs generated by the assistance AI engine 108, which are rendered for viewing by the player 107 while controlling player character 109. In one embodiment, the AI model 110 is trained using a plurality of training footage from many users that have played the game 104. The prior gameplays can come from various disparate sources, including databases of prior gameplays executed using a gaming network, gameplays executed and recorded two videos rendered on third-party video streaming services, gameplay short videos posted to social networks, video clips, gameplay videos and descriptive commentary obtained from Internet websites, or a combination thereof.

Additionally, during the execution of game 104 for rendering the gameplay 112 during the session for the player 107, the game state 114 produced during the gameplay 112 is provided as a feed channel to the AI model 110. The game state 114 is utilized by the AI model 110 to identify game scenarios from prior gameplay that may be similar to the game scenarios occurring in real-time in the gameplay 112. For example, a game scenario occurring in the gameplay 112 shows a bike that can be used in the game scene. The game state 114 identifies this game scene, which is feature processed and classified by the AI model 110. In addition, one or more other training footages may have been previously processed to identify the scene or similar scenes with the bike and the game objective. The assistance AI engine AI can then generate control inputs for the ghost character 113, which will then show the player 107 how to ride the bike or use the bike to achieve progress in the game, score points, or complete a task or tasks.

Thus, once the game scenarios are identified for the current gameplay session, the assistance AI engine 108 can utilize information from the training footage to select control inputs to be utilized to drive interactivity of the ghost character 113. In this manner, the ghost character 113 will provide interactivity that is guiding and teaching the player 107 in real time, so that the player character 109 controlled by the player 107 can attempt to follow and repeat those interactive actions and inputs. As will be described in more detail below, the mode setting is used as a type of filter that defines what type of assistance the ghost character 113 is to provide. Generally speaking, the assistance can range from very detailed or comprehensive assistance to more general or intermittent assistance. In addition to limiting assistance amount, the nature of the assistance can also be varied using the mode settings. In this manner, the assistance AI engine 108 can provide the control inputs to the ghost character 113 that is consistent with the mode settings defined by the user or recommended for the user based on their profile, prior use, or skills.

FIG. 2 illustrates one flowchart process for providing ghost assistance, in accordance with one embodiment. In this example, a game session is executed for a game in operation 202. The game session can be executed on a local machine or on a remote machine, such as a server. The remote machine can be executed in a data center where one or more games, e.g. game titles, are accessible to players that have accounts with the cloud system. In this manner, the gaming is processed and executed on the server and streamed to the remote player, which can be playing the game on any type of device connected to the Internet. In a local computer example, the player can be playing on a personal computer or a game console, or a handheld device. In some embodiments, the local computer can include a head-mounted display (HMD). In one configuration, selection of ghost assistance in operation 204 can be detected before the game session is operational, e.g. before playing the game, or at any point during the gameplay. This provides functionality features that are selectable by a player upon request during gameplay or in preparation for gameplay. In this manner, all or parts of the game session can include gameplay that was assisted utilizing the ghost assistance functionality.

In operation 206, the game session is linked to an assistance artificial intelligence (AI) engine operating in a specific game mode. Broadly speaking, the process of linking the assistance AI engine can be the result of selecting by the player to use ghost assistance, e.g. utilizing a pulldown menu on a graphical user interface, a button press, a verbal input, a gesture, or a combination thereof. The linking should be broadly understood to include simply activating, connecting, or using the ghost assistance function or functionality. In some embodiments, the ghost assistance functionality can be executed by a third-party server, whereby an application programming interface (API) can be used. In another embodiment, the ghost assistance functionality can be integrated as part of the game logic of the game title. In still another embodiment, the ghost assistance functionality can be integrated as part of the system logic, e.g. the system logic utilized by the gaming system, or personal computer. Still further, the game assistance functionality can also be processed by a game console operating system, and is functionally made operable in response to user selection, or system selection via a recommendation or a preplanned operational mode of the assistance functionality.

In operation 208, a ghost character is rendered for performing interactive actions in the gameplay of the game based on control inputs. The control inputs are generated by the assistance AI engine to guide the player along an interactive path of the game. Broadly speaking, the ghost character can be generated as a transparent game character that may be illustrating game interactivity that can be viewed and is visible to the player that is controlling a player character during the gaming session. The ghost character 113 can therefore perform actions, moves, inputs, stunts, that can be followed by the player character 109, in response to controlling by the player 107. In one embodiment, the actions performed by the ghost character 113 can be viewed by the player 107, but may not in some embodiments advance the actual interactive gameplay.

By way of example, if the ghost character 113 scores a touchdown, the score associated with a touchdown scored by the ghost character 113 may not count in the game. For instance, the ghost character 113 can be shown scoring a touchdown and then the player 107 can try to score the touchdown in the same form, but the score performed by the ghost character 113 will not count in the score or a replay is done that eliminates the actual action performed by the ghost character 113. This leaves the game interactivity and progress in the game to be associated with actions performed by the player character 109, and not by the ghost character 113.

In still another embodiment, the ghost character 113 can perform actions that are actually scored and made viable to make advances in the game (i.e., will count in the game for advancement of the player 107). The player character 109 can also simply follow the ghost character 113 as the ghost character 113 scores, advances, makes points, etc., and such points are credited to the player character 109. In some other embodiments, a hybrid approach can be processed where some actions by the ghost character 113 count for the player, and some actions must be done by the player character 113 in order for the points to count for the player. This hybrid approach can, in some cases, be activated periodically and deactivated periodically during the game play (e.g., either at the input direction of the player or automatically be an algorithm).

This mode may be associated with a complete mode. The complete mode can be selected as one of the mode settings 116. In the complete mode, the ghost character 113 is actually completing game tasks and advancing the player. In contrast, the guide mode which showed the ghost character 113 performing guiding examples of interactivity, for which the player character 109 must follow and complete to advance. In both situations, the ghost character is rendered in the scene of the gameplay being performed during the game session by the player.

Figure 3:
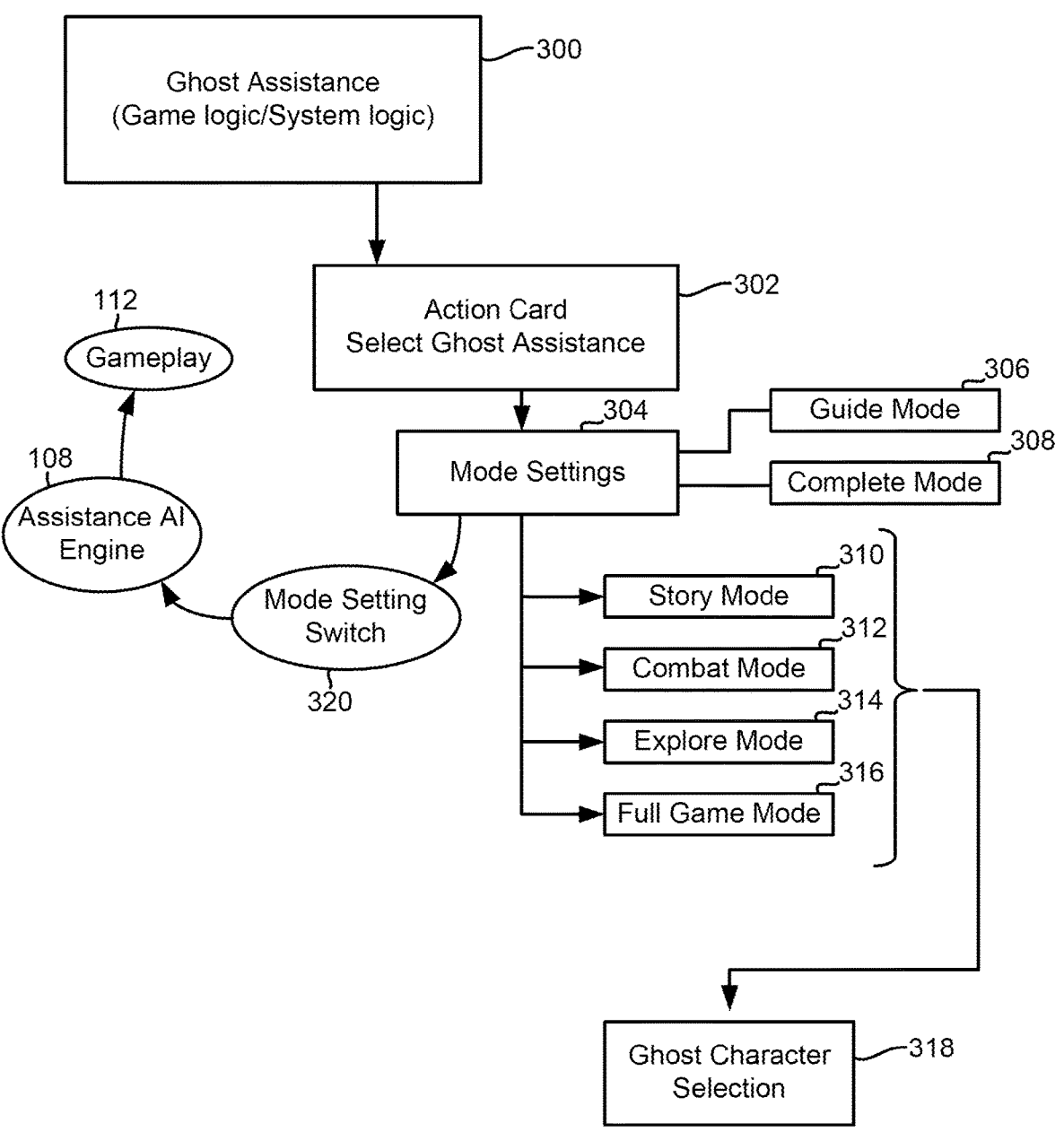
FIG. 3 provides another flow diagram illustrating another example associated with providing ghost assistance, in accordance with one embodiment.

FIG. 3 provides another flow diagram illustrating another example associated with providing ghost assistance, in accordance with one embodiment. In operation 300, the ghost assistance is identified to be provided by either the game logic or system logic. As mentioned above, game titles can integrate the assistance functionality and code of the assistance AI engine for use during the gameplay. In another embodiment, the ghost assistance logic, and associated assistance AI engine can be executed and managed by the game system logic. In one embodiment, the game system logic can be the system logic of a console used for gaming. In another embodiment, the system logic can be stored and executed in the cloud as part of the service, e.g. for streaming games.

In operation 302, an action card is utilized to identify the selection input of the ghost assistance. For example, the ghost assistance logic can include a tree of settings that can be organized to provide inputs for selecting different types of modes. As shown, once the selection input of the ghost assistance has been selected in operation 302, mode setting options 304 can be provided. In one embodiment, the user can select the guide mode 306 or the complete mode 308. As mentioned above, the guide mode 306 allows the user to follow the ghost player, which is generated by the computer from a collection of gameplay videos across the game territory as a guide through the game. The complete mode 308 allows the user to give momentary control over to the ghost character, and watch as the ghost character completes the level for the user alleviating the stress of the user.

In some embodiments, the mode settings 304 can also include more detailed mode settings that defined the style in which the ghost assistance will be provided. By way of example, the mode settings associated with different types of styles can include a story mode 310, a combat mode 312, and explore mode 314, a full game mode 316, and others. Based on the selections, the ghost character selection 318 occurs, which is a ghost character that will behave in accordance with the mode settings 304 that have been selected.

In one example, the story mode 310 setting can include having the assistance AI engine that will compile a ghost narrative of only essential story pieces allowing the player to follow the ghost through the game and complete the game's storyline. In the combat mode 312, the assistance AI engine would compile a ghost narrative with combat movements from the game, and allow the player to follow the ghost through the game focused on the combat scenes. In the exploration mode 314, a completion list type mode would be executed where the assistance AI engine would compile a ghost narrative that is focused on discovery moments and collecting of new and potentially rare items, weapons, new areas, and the like. In the full game mode 316 setting, the assistance AI engine would allow the AI ghost to lead the user through the game as it is normally sequentially played. As can be appreciated, this type of selection of mode settings 304 would allow the player to select between the different types and ways (styles) that they want the ghost character to lead in the assistance. Broadly speaking, the ghost character generated by the ghost assistance logic is an AI generated visual overlay of gameplay footage that helps to serve as a guide to the user in the game.

The AI character (e.g., ghost character) is created within aggregation of user generated content (UGC) from in game moments across all systems, including internal network content, third-party videos, social media sites, video media sites, gaming media sites, and the like. All of this information can be utilized as the training footage (TF1-TFn) shown in FIG. 1. In this way, the AI model 110 is continuously learning the game scenarios occurring in the various gameplays videos, and generally gaming content, in order to learn how to play the game for the various scenarios. The assistance AI engine 108 can then access the AI model 110 in accordance with the mode settings 116 to provide the inputs necessary for guiding and controlling the ghost character 113 in the gameplay of the player 107.

Continuing with FIG. 3, once the mode settings 304 have been defined, the mode setting switch 320 can define the logic that changes the way the assistance AI engine 108 behaves during gameplay 112. For example, the player can switch between a story mode 310 and then explore mode 314 mid-session. In other embodiments, switching can include changes between operating under a guide mode 306 or a complete mode 308. These changes of the mode setting switch 320 can occur on-the-fly, e.g. during gameplay or during pauses, or before specific levels or before specific tasks, or a combination thereof. Accordingly, the game assistance AI engine 108 is dynamically providing the control inputs to guide the ghost character 113 within the gameplay 112 in real time, based on the mode settings 304 selected and/or switched to during the game session. In some embodiments, the mode setting switch 320 can be done dynamically by the system, based on learned training. For example, the machine learning can be utilized to identify when specific mode settings are preferred by the player for completing specific tasks, which in turn changes the mode settings 314 dynamically so that the assistance AI engine 108 behaves differently depending on the context of the game and the scenarios being encountered by the player.

Figure 4A:
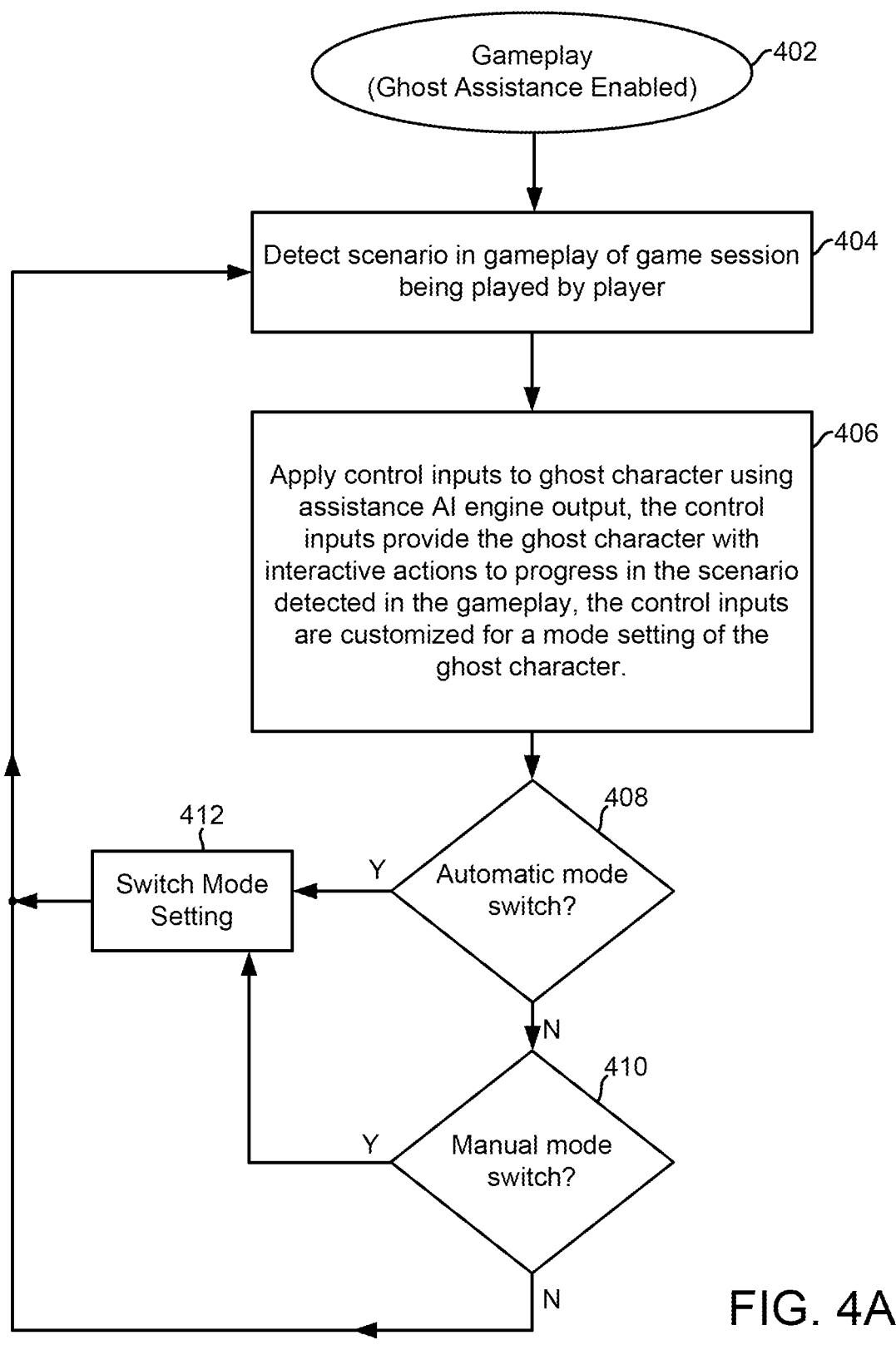
FIG. 4A illustrates a flow diagram showing the enablement of ghost assistance during gameplay, in accordance with one embodiment.

FIG. 4A illustrates a flow diagram showing the enablement of ghost assistance during gameplay 402, in accordance with one embodiment. As shown, during operation 404, a scenario in the gameplay of a game session being played by the player is detected. As mentioned above, the assistance AI engine 108 accesses an AI model 110 in order to identify scenarios occurring in the gameplay. The scenarios occurring in the gameplay are identified because the AI model 110 is trained using many types of training footages from prior gameplays of the game. The prior game footage can be saved as gameplays, state data, recordings, social media site video clips, screen shots, network gaming history, and an aggregation thereof.

The more the game is played and content associated with the game is accessed and processed, the AI model 110 will learn more and different types of game scenarios that can occur in the game. It should be understood that the game scenarios being learned are for specific games. Each game will have different game scenarios, and an AI model 110 can be instantiated and generated for each game, such that each bed model 110 can be unique and specific for the specific game being learned In this manner, when a user is playing the game, and scenarios occurred during the gameplay, the game state information that has been generated during the gameplay can be utilized by the AI model 110 and the assistance AI engine 108 to identify similar scenarios that occurred before in order to generate control inputs for a ghost character 113. The ghost character 113 can provide the ghost assistance because the ghost character 113 has learned utilizing the AI model 110 and assistance AI engine 108 what types of moves, actions, interactivity, or skills are needed to complete a specific game scenario which is then illustrated in accordance with the mode settings 116 for viewing by the player 107. The player 107 can then try to complete those interactive skills using the player character 109.

In operation 406, the control inputs are applied to the ghost character using the assistance AI engine output. The control inputs provide the ghost character with the interactive actions to progress in the scenario detected in the gameplay. The control inputs are customized for the mode setting of the ghost character. In one embodiment, in operation 408 it is determined if the mode settings should be switched automatically. Mode settings can be switched automatically based on user profile settings, based on learned preferences of the user, or based on recommendations made by an AI engine or logic that understands the level and interactivity that is occurring in the context of the gameplay.

If the mode switch is done automatically, the mode switch setting is applied so that the assistance AI engine can generate the control inputs to the ghost character in accordance with the mode setting. If the mode settings are automatic, the method determines if a manual mode setting has been received 410. If the manual mode setting is received, the mode switch setting for 12 is applied and therefore the assistance AI engine can generate the output of control inputs consistent with the mode setting. If no mode settings are determined to have occurred, the assistance AI engine will continue to output control inputs to guide in controlling the ghost character in the interactivity of gameplay.

Figure 4B:
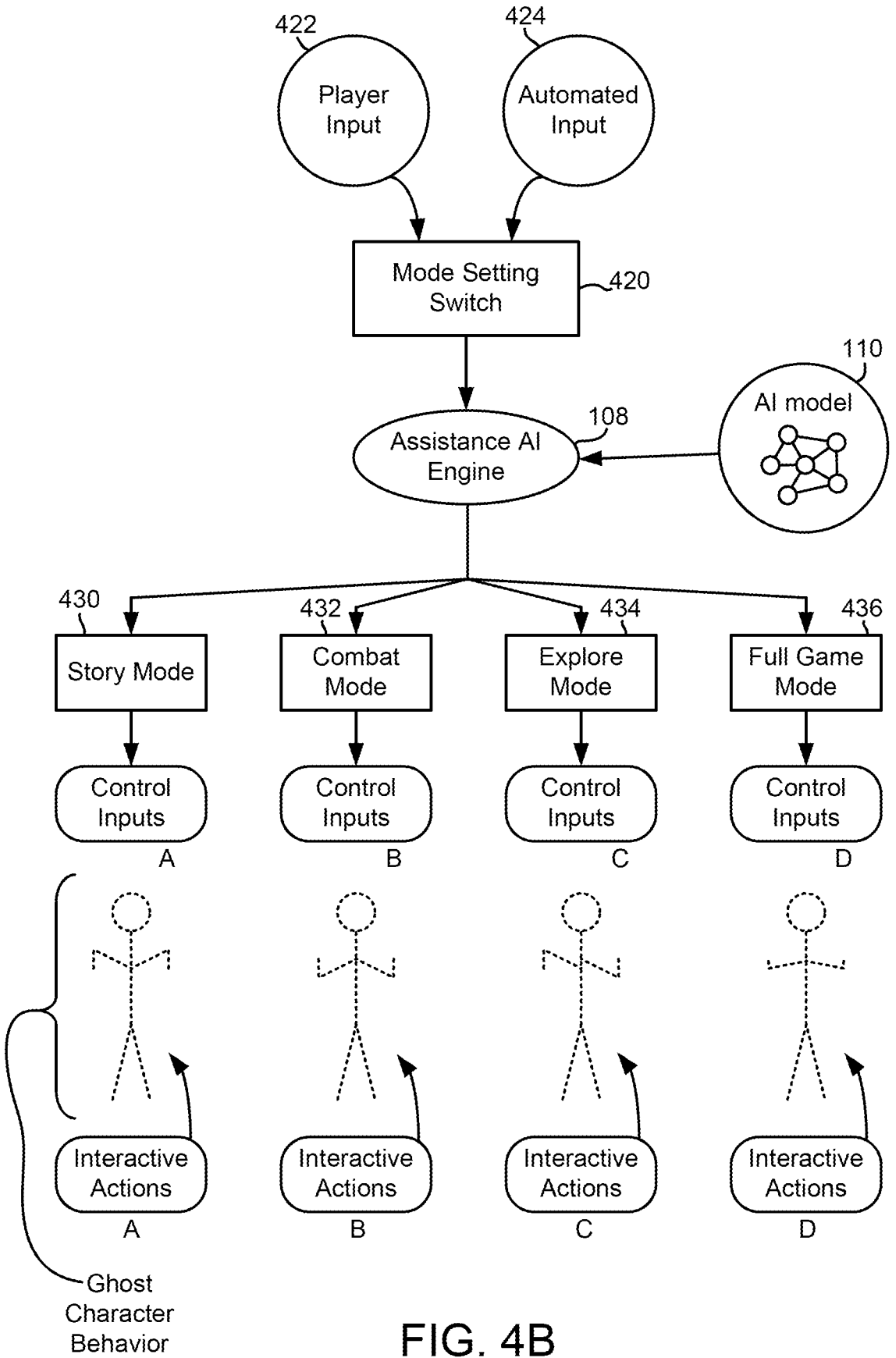
FIG. 4B illustrates another example of providing mode setting switching, which controls operation of the assistance AI engine.

FIG. 4B illustrates another example of providing mode setting switching 420, which controls operation of the assistance AI engine 108. As illustrated, player input 422 can be used to provide a switch in mode setting. The player input can be by way of a user interface selection screen, a button press, a controller motion, a verbal input, a gesture, or any other type of input that can be received by an interface to provide a computer an indication that a selection has been made. The mode settings can also be generated by an automated input 424. The automated input 424 can be generated responsive to settings in a user profile of the player. In other embodiments, the user profile can be updated from time to time based on learned player metrics, player interactivity, preferences, and the like. This information can then be utilized to generate automated inputs 424. In still another embodiment, machine learning can be utilized to determine when an automated input 424 should be generated in order to change the mode setting.

Once the mode setting switch 420 has been activated, the assistance AI engine 108 will change its method of providing assistance. The method of providing assistance can take the form of global assistance rules, such as following a guide mode, or complete mode. In other embodiments, more stylistic modes can be selected to determine and identify the style in which the assistance is provided. The assistance AI engine 108 will receive input from the AI model 110, which is continuously learning from training footage associated with the game being played. In some embodiments, the AI model 110 is customized to the player, such that the assistance is more customized to the player's style. In another embodiment, the AI model 110 is more global, such that more videos and media is accessed from any number of sources in order to identify game scenarios in the game being played by the player.

In this example, the game assistance AI engine 108 can operate in a number of mode settings. The example mode settings, without limitation to other types of mode settings that are envisioned within this disclosure, include a story mode 430, a combat mode 432, and explore mode 434, and a full game mode 436. Based on the mode settings that were selected, either by the player or automated, the control inputs will change, such as control inputs A, B, C, and D. These control inputs will be different, since the ghost character 113 will be controlled by the control inputs as illustrated by the dashed stick figures shown.

The dashed stick figures will provide an illustration of corresponding interactive actions A, B, C, and D, based on the mode setting. As mentioned above, the interactive actions made by the ghost character 113 will be consistent with the control inputs provided by the assistance AI engine 108 which is then implemented in the form of a ghost overlay character in the gameplay. In another embodiment, the ghost character 113 does not have to be a dashed or ghosted figure. For example, the ghost character 113 can be customized figure or character from another game or a fictional character from a movie.

By way of example, the ghost character can be an animated representation of all-knowing Yoda from Star Wars. By way of example, Yoda can provide not just interactive moves to show how to play specific scenarios of the game, but can also provide verbal communication to the player character 109, which is listened to by the player 107. The ghost assistance therefore can be a combination of moves and actions an interactive action performed by the ghost character or can be in the form of verbal or gestures provided that can be viewable by the player 107 controlling player character 109 in the game scene during a game session. If the verbal gesture is provided by the animated character Yoda, the visual representation of Yoda can be rendered in the form of Yoda speaking back to the character controlled by the player.

In this manner, the verbal feedback provided by the ghost character 113 (whether in the form of an animated character or a ghosted object or character), will assist the player in completing a task, level, interactive motion, or generally build skills for playing the game during gameplay.

In still another embodiment, the player can also ask questions of the ghost character. The player can provide verbal input through an audio channel requesting help for completing a specific scenario. For example, the player can say "how do I jump the river?" The assistance AI engine will then look to the AI model to determine how the river should be jumped, and the ghost character can speak back to the player to explain how to jump the river. In another embodiment, the ghost character can simply demonstrate how to jump the river. This provides for an interactive method for the player character to speak to and use the ghost character as an interactive assistance bot, when playing the game. It should be understood that the ghost assistance can be switched on and off at the direction of the player. Therefore, the player does not have to continue playing in the ghost mode, but may pause the ghost mode for certain interactive scenarios, and then resume with the ghost mode.

Still further, other embodiments for providing ghost assistance can include providing color indicators. Color indicators can be ghosted or shadowed or overlaid indicators that assist the player in identifying content that is relevant to progressing in the game. For example, the color indicators can be provided by the ghost assistance logic to highlight the door that provides an exit to a room, highlights an object to be captured by the player, highlights a game controller input to be selected, or a combination thereof. These color indicators can be also be integrated into the ghost character 113. The ghost character 113 can change colors depending on the urgency of the assistance being provided. If the assistance is very urgent, the ghost character can turn red for example. If the assistance is not urgent, the ghost character can simply be green or a shade thereof. In still other embodiments, the assistance can also be in the form of text and comments that can be floated over the game scene. The text can provide description of what needs to happen or what moves need to be made by the player in order to progress. In still another embodiment, the providing of text bubbles, icons, chat, voice, and illustration of interactive moves can all be blended together to provide more intensive and comprehensive assistance.

As mentioned above, the assistance provided by the ghost mode can be integrated into specific game logic of a title. In another embodiment, it can be executed by system logic of a system used for playing the game. In other embodiments, the assistance logic can be integrated into middleware, which can be utilized for legacy games including a new and current games.

Figure 5:
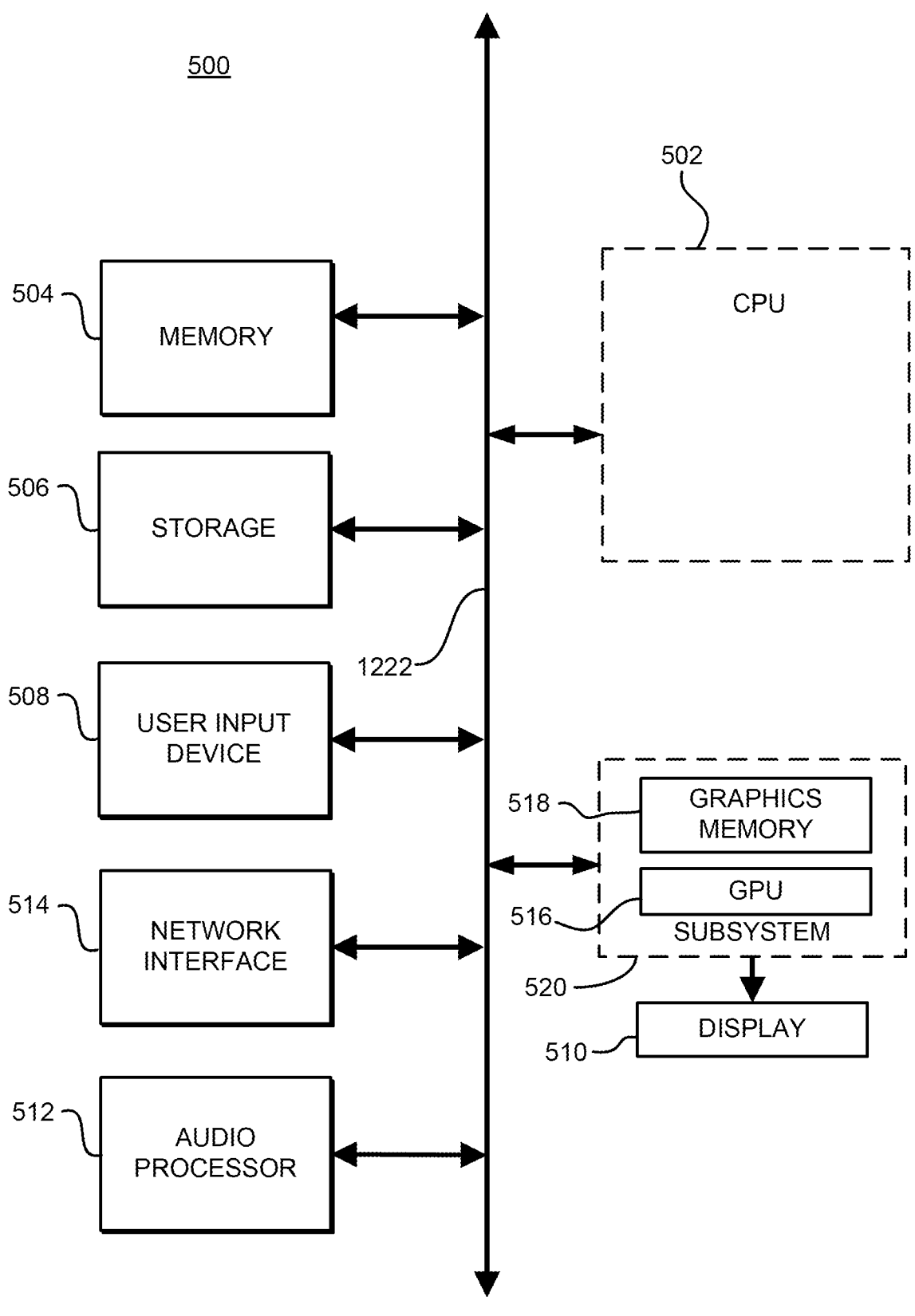
FIG. 5 illustrates components of an example device and/or platform system that can be used to perform aspects of the various embodiments of the present disclosure.

FIG. 5 illustrates components of an example device 500 that can be used to perform aspects of the various embodiments of the present disclosure. This block diagram illustrates a device 500 that can incorporate or can be a personal computer, video game console, personal digital assistant, a server or other digital device, suitable for practicing an embodiment of the disclosure. Device 500 includes a central processing unit (CPU) 502 for running software applications and optionally an operating system. CPU 502 may be comprised of one or more homogeneous or heterogeneous processing cores. For example, CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be localized to a player playing a game segment (e.g., game console), or remote from the player (e.g., back-end server processor), or one of many servers using virtualization in a game cloud system for remote streaming of gameplay to clients.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 510, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 508, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In one embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs.

The graphics subsystem 514 periodically outputs pixel data for an image from graphics memory 518 to be displayed on display device 510. Display device 510 can be any device capable of displaying visual information in response to a signal from the device 500, including CRT, LCD, plasma, and OLED displays. Device 500 can provide the display device 510 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, gameplay replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as HTML, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen input corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from them, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A computer-implemented method comprising:
executing a video game in which a player controls a player character;
detecting a request by the player for ghost assistance in completing a task;
repeatedly, until the player completes the task:
determining a current gameplay scenario of the player character,
linking, in real time to the player providing control inputs for controlling the player character, the task and the current gameplay scenario to an assistance artificial intelligence (AI) engine that generates control inputs for completing different tasks given different gameplay scenarios; and
rendering the ghost character performing interactive actions in the video game based on control inputs that are generated by the assistance AI engine based on the current gameplay scenario and the task.

2. The computer-implemented method of claim 1, wherein determining a current gameplay scenario of the player character comprises:
analyzing game state data in order to identify a scenario occurring in the context of the gameplay of the player.

3. The computer-implemented method of claim 2, wherein analyzing game state data in order to identify a scenario occurring in the context of the gameplay of the player comprises:
extracting context features from the game state data; and
classifying, using the context features, the game state as a gameplay scenario.

4. The computer-implemented method of claim 3, wherein an AI model of the assistance AI engine is trained to associate one or more context features with a game scenario.

5. The computer-implemented method of claim 1, wherein generating control inputs for the determined current gameplay scenario comprises:
selecting control inputs to perform interactive actions based on the determined current gameplay scenario and a plurality of training footage.

6. The computer-implemented method of claim 5, wherein an AI model of the assistance AI engine is trained to learn a plurality of interactive actions to perform the task from the plurality of training footage.

7. The computer-implemented method of claim 1, wherein the ghost character provides visual illustrations of how certain game scenarios are played in order for the character controlled by the player to be able to achieve progress in the game.

8. The computer-implemented method of claim 1, wherein the ghost character provides different degrees of assistance.

9. The computer-implemented method of claim 8, wherein the ghost character provides (i) limited assistance, (ii) detailed assistance, or (iii) comprehensive assistance.

10. The computer implemented method of claim 1, wherein the ghost character provides example controller input button sequences for the player.

11. The computer-implemented method of claim 1, wherein the ghost character can hold an interactive conversation with the player character of the player.

12. The computer-implemented method of claim 1, wherein the player can ask the ghost character for assistance using one or more natural language queries.

13. The computer-implemented method of claim 1, wherein the task can comprise at least one of: (i) moving from one gameplay scenario to another, (ii) achieving an interactivity skill, (iii) learning an input combination, (iv) learning a new path to take throughout the game world, (v) conquering one or more obstacles, (vi) beating bosses, (vii) scoring points, (viii) winning trophies, and (viv) advancing from one stage to another stage in the game.

14. The computer-implemented method of claim 1, wherein the ghost assistance can be selected by the player (i) before gameplay begins or (ii) during gameplay.

15. The computer-implemented method of claim 1, wherein the interactive actions performed by the ghost character can count towards progress of the player in the game.

16. The computer-implemented method of claim 1, wherein the ghost character can operate in a plurality of modes.

17. The computer-implemented method of claim 16, wherein the ghost character can operate in a complete mode in which the interactive actions of the ghost character can complete the task for the player.

18. The computer-implemented method of claim 16, wherein the ghost character can operate in a guide mode in which the interactive actions of the ghost character can guide the player to complete the task.

19. A system comprising:
one or more computing devices; and one or more storage devices communicatively coupled to the one or more computing devices, wherein the one or more storage devices store instructions that, when executed by the one or more computing devices, cause the one or more computing device to perform operations comprising:
executing a video game in which a player controls a player character;
detecting a request by the player for ghost assistance in completing a task;
repeatedly, until the player completes the task:
determining a current gameplay scenario of the player character;
linking, in real time to the player providing control inputs for controlling the player character, the task and the current gameplay scenario to an assistance artificial intelligence (AI) engine that generates control inputs for completing different tasks given different gameplay scenarios; and
rendering the ghost character performing interactive actions in the video game based on control inputs that are generated by the assistance AI engine based on the current gameplay scenario and the task.

20. One or more non-transitory computer storage media encoded with computer program instructions that when executed by one or more computers cause the one or more computers to perform operations comprising:
executing a video game in which a player controls a player character;
detecting a request by the player for ghost assistance in completing a task;
repeatedly, until the player completes the task:
determining a current gameplay scenario of the player character;
linking, in real time to the player providing control inputs for controlling the player character, the task and the current gameplay scenario to an assistance artificial intelligence (AI) engine that generates control inputs for completing different tasks given different gameplay scenarios; and
rendering the ghost character performing interactive actions in the video game based on control inputs that are generated by the assistance AI engine based on the current gameplay scenario and the task.

* * * * *